United States Patent [19]

Focke et al.

[11] 4,358,336

[45] Nov. 9, 1982

[54] DEVICE FOR APPLYING TAPES (TEAR-TAPES) OR THE LIKE TO A WEB OF MATERIAL

[75] Inventors: Heinz H. Focke, Verden; Hans-Jürgen Bretthauer, Bremen, both of Fed. Rep. of Germany

[73] Assignee: Focke & Co., Verden, Fed. Rep. of Germany

[21] Appl. No.: 116,724

[22] Filed: Jan. 30, 1980

[30] Foreign Application Priority Data

Feb. 5, 1979 [DE] Fed. Rep. of Germany ....... 2904204

[51] Int. Cl.³ ....................... B32B 31/10; B65H 17/42

[52] U.S. Cl. .................................... 156/518; 156/504; 156/519; 156/520; 226/114; 226/118; 242/58.1

[58] Field of Search ............... 156/291, 504, 519, 520, 156/518; 242/58.1; 226/113, 114, 118

[56] References Cited

U.S. PATENT DOCUMENTS

| | | | |
|---|---|---|---|
| 2,865,261 | 12/1958 | Seragnou | 156/520 X |
| 3,707,420 | 12/1972 | Young et al. | 156/518 X |
| 4,071,178 | 1/1978 | Copp | 226/114 X |
| 4,169,752 | 10/1979 | Tokuno | 156/504 X |

*Primary Examiner*—Edward C. Kimlin
*Assistant Examiner*—Robert A. Dawson
*Attorney, Agent, or Firm*—Sughrue, Mion, Zinn, Macpeak & Seas

[57] ABSTRACT

A method and apparatus for applying tear tapes or the like to a transported web of cellulose wrapping material. A first portion of the travelling web is momentarily halted during the application of the tear tape, which takes place by a heat welding method. During the period of time while the first portion of the web is stationary, the remaining portions of the web continue to be transported at a constant speed, due to the effect of a pair of pivotally mounted diverting rollers which form web reserves on either side of the stationary first portion.

8 Claims, 3 Drawing Figures

DEVICE FOR APPLYING TAPES (TEAR-TAPES) OR THE LIKE TO A WEB OF MATERIAL

Figure 1:
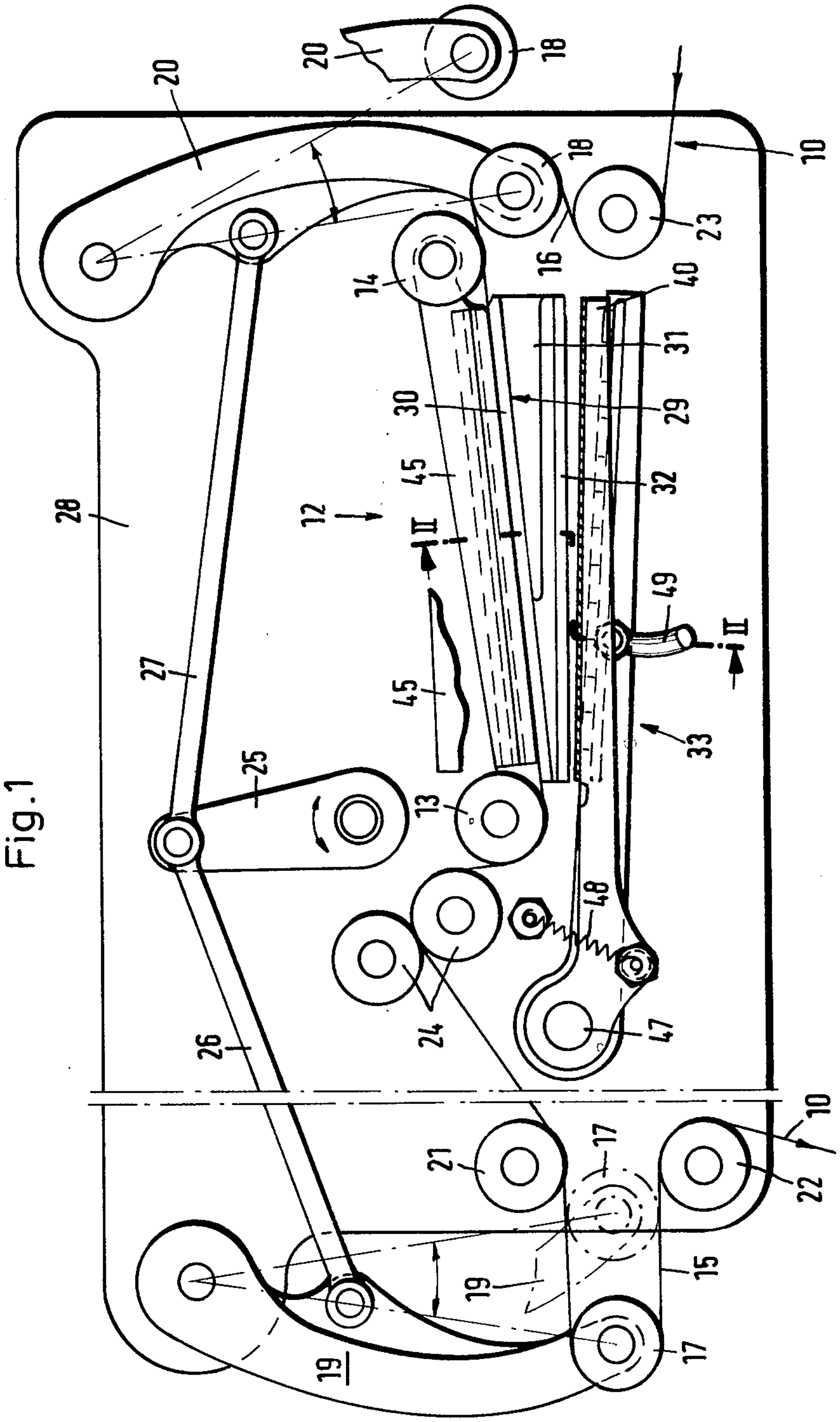

The present invention relates to a process and device for applying tapes, namely tear-tapes or the like, to a transported material web (a web of wrapping material).

Outer wraps of packs, in particular cellulose film or plastic wraps of cigarette packs and the like, are usually provided with a welded-on or glued-on tear tape. The blank of the wrap is severed from a continuous, uninterrupted web of wrapping material. First, however, the separately produced tear-tape, namely the tear-tape which has been severed from a web of tape, is placed on the web of wrapping material and bonded to the latter.

A device in which the web of wrapping material and the web of tape are transported synchronously has been disclosed. The web of tape is in each step moved onwards by an amount corresponding to the width of a tape to be severed. The web of wrapping material is moved stepwise, in accordance therewith. At the instant at which the web of wrapping material stops, a severed tape is supplied and placed on the web of wrapping material. The severing device used comprises a movable cutter; this cutter at the same time feeds the severed tape to the web of wrapping material.

The stepwise transport of the web of wrapping material must be regarded as a disadvantage. The controlled stopping and acceleration of the web is time-consuming, so that extremely short cycle times cannot be achieved. Furthermore, the frequent acceleration and retardation of the roll (bobbin) of material web is a disadvantage.

It is the object of the present invention to propose a process and device for bringing together, and combining, the tape and the web of wrapping material, in which process, and with which device, high cycle speeds can be achieved and nevertheless perfect transfer of the severed tape to the web of material is ensured.

To achieve this object, the invention proposes that the web of wrapping material stops momentarily, namely during transfer, in the region of the transfer of the tear-tape (the transfer portion), whilst outside this region the web continues to be transported continuously and that after the tape has been taken up by the web the portion in question is moved onwards at a correspondingly higher speed.

Accordingly, in the invention the web of wrapping material is in effect transported continuously. It is in any case not necessary to employ interruptions in the advance of the web, or even a non-uniform motion, on the delivery side, namely in the region of bobbins, or on the take-up side, namely in the region where the web provided with the tape is processed further. However, a particular region or portion of the web of wrapping material is moved discontinuously, namely stepwise, relative to the remaining part.

The device according to the invention is provided with guide members, namely direction-change members, in particular direction-change rollers, for the web of wrapping material, these members being movable to and fro simultaneously on either side of the transfer portion. They are moved in such a way that the region located between these direction-changing members, including the transfer portion, stops, or continues to travel at reduced speed, during one phase, so that the tear-tape supplied from below or above can be transferred trouble-free to the web of wrapping material. Thereafter, a correspondingly higher, compensated speed is imparted to this portion by an oppositely directed movement of the direction-change members.

According to a further proposal of the invention, the direction-change rollers are located on rockers which form complementary web loops which increase and decrease.

Further characteristics of the invention concern the design and arrangement of the rockers and their drive. Yet further characteristics of the invention concern the design of the severing device for the production of the tapes.

Figure 2:
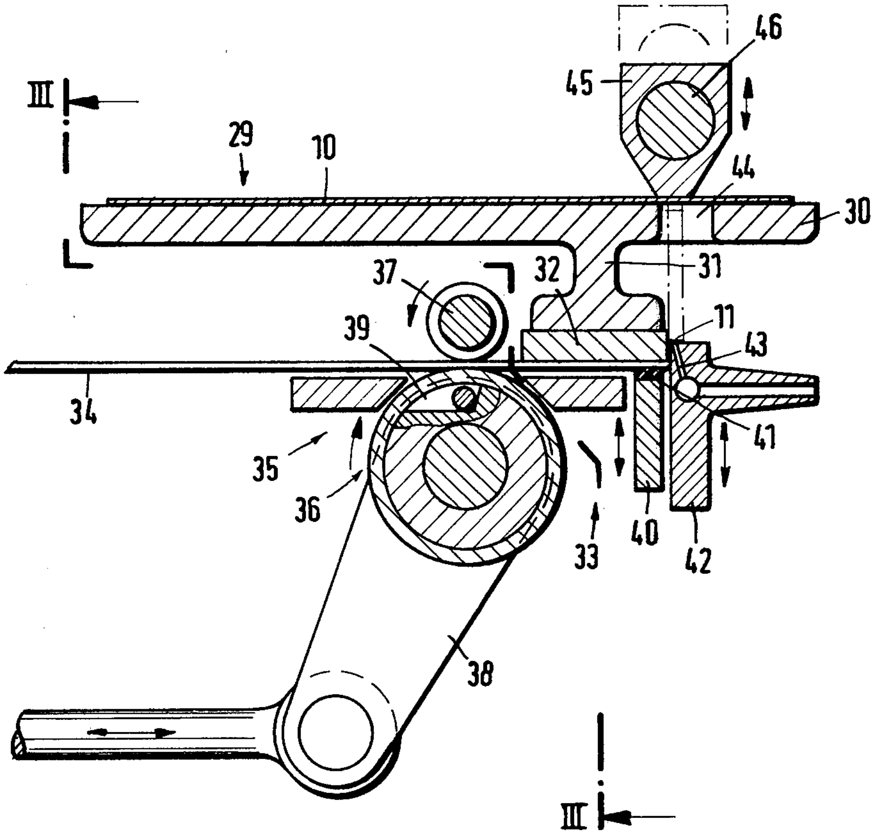
Figure 3:
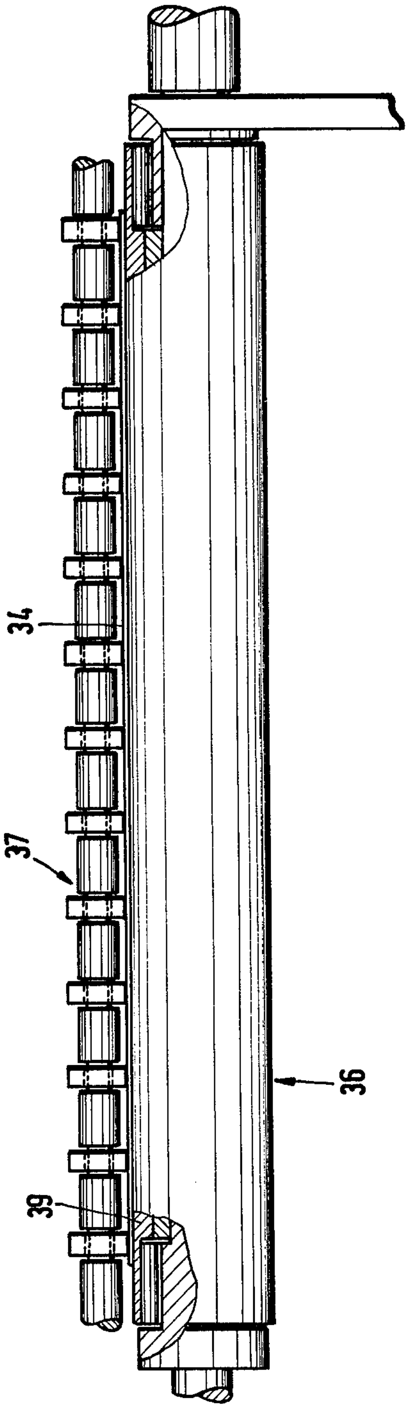

An illustrative embodiment of the invention is explained in more detail below in relation to the drawing. In this:

FIG. 1 shows a diagrammatic overall view of an embodiment of a device for severing and transferring a tape to a web of wrapping material, FIG. 2 shows a cross-section II—II in FIG. 1, in the region of a detail of the device, on an enlarged scale and FIG. 3 shows a detail of a cutting device for tapes, as a section III—III or view accompanying FIG. 2.

In the illustrative embodiment shown in the drawings, separately produced tapes 11 are applied to a web of wrapping material 10, and bonded on by heat-welding. The wrapping material 10 can consist of cellulose film and the tape 11 of a corresponding material. The tapes 11 are here fed to the web of wrapping material 10 from below, with the lengthwise axis pointing in the direction of feed of the wrapping material web 10.

The transfer of the tape 11 to the wrapping material web 10 takes place in the region of a transfer portion 12 of the wrapping material web 10. This portion here runs substantially horizontally or slightly downwards in the direction of transport. The transfer section 12 is essentially defined by direction-change rollers 13 and 14.

At the instant of transfer of the tape 11, the transfer portion 12 is static, whilst outside this portion the wrapping material web travels continuously, preferably at constant speed. After the tape 11 has been transferred, the transfer portion 12 is appropriately accelerated.

On either side of the transfer portion 12, web loops 15 and 16 are formed, which supplement one another to form a "web reserve", the total amount of which always remains constant. The web loops 15, 16 change their size continuously during the non-uniform, stepwise movement of the wrapping material web 10 in the region of the transfer portion 12 and in the region between the direction-change rollers 17 and 18 of rockers 19 and 20. As a result of to-and-fro rocking movement, the abovementioned rockers 19, 20 provide varying web loops 15 and 16. The respective end positions of the rockers 19, 20 and of the direction-change rollers 17 and 18 located on them are shown by solid lines and broken lines in FIG. 1.

In the present instance, the web loops 15 and 16 are produced by the direction-change rollers 17 and 18 between fixed counter-rollers located at an appropriate distance from one another. In the present illustrative embodiment, two direction-change rollers 21 and 22, arranged at a distance above one another, are allotted to the rocker 19. In the region of the rocker 20, the web loop 16 is formed between the direction-change roller 14 at the end of the transfer portion 12, and a direction-change roller 23 located at a distance below the roller 14. In the present illustrative embodiment, the portion which stops during transfer of the tape 11 is longer than the transfer portion 12. A pair of guide rollers 24 is provided in the region between the direction-change roller 13 and the direction-change roller 21.

The synchronous drive of the rockers 19, 20 is effected by means of a common drive arm 25, which moves to and fro in a pivoting sense, and which is connected by means of connecting rods 26 and 27 to the two rockers 19, 20. The rockers 19, 20, including the drive arm 25 and a number of the direction-change rollers are, in the present case, mounted on a common support plate 28 of the device.

The plane transfer portion 12 of the wrapping material web 10 is led, in the present instance, over a fixed table 29. Its support plate 30 for the wrapping material web 10 in the present embodiment is angled downwards in the direction of travel. A backing plate 32 is formed below the support plate 30 with the aid of a wedge-shaped spacer 31. This backing plate 32 forms part of a severing and transfer unit 33 for the tape 11.

A tape web 34 runs below the table 29, namely immediately below the backing plate 32, in a direction transversely to the direction of travel of the wrapping material web 10. Below the backing plate, the tapes 11 are severed, in each case along the free edge of the tape web 34, that is to say transversely to its direction of travel. Thereafter the tapes 11, with their longitudinal axis in the direction of travel or longitudinal direction of the wrapping material web 10, are fed to the said web and attached to its underside.

The tape web 34 is fed to the severing point by means of a traction unit 35. This comprises a lower drive roller 36 which rotates to and fro stepwise, and a counter-roller 37 which is located above the tape web 34. The drive roller 36 is driven by an arm 38 which pivots to and fro, in each case, in the direction of rotation, by an amount corresponding to the amount cut off the tape web 34. An idling device 39 of conventional construction ensures that the drive roller 36 returns to its starting position without exercising a driving action.

The free front end of the tape web 34 is clamped momentarily, namely for the moment during which a severing cut is executed. For this purpose, a clamping bar 40 carrying a resilient covering 41 is brought up against the tape web 34 from below and presses the web against the underside of the backing plate 32. The tape web 34 is controlled in such a way that it projects slightly, namely by the width of a tape 11, beyond the backing plate 32. This projecting end is severed by the upward motion of a severing cutter which can be moved up and down. For the cut, the backing plate 32, or its edge facing the severing cutter 42, serves as the backing cutter.

The severing cutter 42 is provided with suction holes 43 on its upper face, namely in the region in which the tape 11 rests on it. These holes are subjected to suction at the instant of severing, and thereafter. This fixes the severed tape 11 to the upper face of the severing cutter 42. As the cycle proceeds, this cutter serves as the transporting member for the tape 11 until the latter rests against the underside of the wrapping material web 10.

The table 29, or its support plate 30, is provided, in the region of the path of the severing cutter 42, with an elongate perforation 44. The upper part of the severing cutter 42, carrying the tape 11, passes through this perforation until the tape rests against the wrapping material web 10.

An elongate, rod-shaped backing holder 45, which can be moved up and down, is located on the side of the wrapping material web 10 which is opposite the perforation 44. At the instant of the tape 11 arriving, this backing holder makes contact with the wrapping material web 10 on the opposite side thereof. In the present instance, the backing holder 45 is fitted with a heating cartridge 46. This allows the tape 11 to be fixed to the wrapping material web 10 by heat-welding.

As may be seen from FIG. 1, the movable parts, described above, of the severing and transfer unit 33 are subjected only to a pivoting motion and not to a translatory motion. The severing cutter 42 is movable about a pivot bearing 47, namely by means of a tension spring 48, which constantly prestresses the severing cutter 42 in the direction towards the wrapping material web 10. The opposite motion can in the present instance be effected by means of a shaft in the region of the pivot bearing 47.

The backing holder 45 can be pivoted correspondingly, namely about the axis of the direction-change roller 14. Here again the pivot drive can be effected by a shaft in the region of the bearing or direction-change roller.

The suction holes 43 of the severing cutter 42 are subjected to suction from a central suction line 49.

The wrapping material web 10 is driven, namely drawn off continuously, by drive devices not shown in detail in the present drawings, in particular by pairs of draw rollers. The pivoting movement of the rockers 19, 20 is controlled synchronously with the severing and transfer unit 33. FIG. 1 shows the instant at which the movement of the rockers 19, 20 is reversed. This causes the transfer portion 12 or the region of wrapping material 10 between the rockers 19 and 20 to stop momentarily. During this static phase, the material loop 16 progressively increases, whilst the loop 15 decreases. After the tape 11 has been fed to the wrapping material web 10, the direction of movement of the rockers 19, 20 is reversed, so that the region of the wrapping material web 10 between the rockers 19, 20 is accelerated to a correspondingly higher speed. Accordingly, in effect, counter-movements and correspondingly increased speeds in the direction of travel, are produced momentarily in this region.

We claim:

1. A device for applying tear tapes or the like to a wrapping material web, including conveying devices both for a tape web and for the wrapping material web and including a cutting device, comprising a fixed cutter and a movable cutter for severing the tear tapes traversely from the tape web, the movable cutter being provided with vacuum operated retaining means for holding, transporting and transfering the cut-off tape to the wrapping material web, said device further including direction-change devices for said wrapping material web including diverting rollers (17,18), located upstream and downstream of a transfer portion (12) of said wrapping material web, said wrapping material web passing around portions of said rollers, the rollers being attached to pivotally mounted rockers, said rockers being synchronously reciprocatingly driven at a speed and in a direction to by themselves stop movement of said web in at least said transfer portion (12) thereof at an instant of transfer of the cut-off tapes (11) to said wrapping material web, while portions of said wrapping material web located upstream and downstream of said transfer portion continue to be transported.

2. A device according to claim 1, wherein the diverting rollers (17, 18) form mutually complementary web loops (15,16) of the wrapping material web (10).

3. A device according to claim 1, wherein the rockers (19,20) are connected to a common drive arm (25) via connecting rods (26,27) and are driven such that the diverting rollers (17,18) which form the web loops (15, 16) are moved substantially horizontally.

4. A device according to claim 3, wherein the wrapping material web (10) forms a plane transfer portion (12) inclined in the direction of transport, in the region of a table (29), and the tape (11), severed from said tape web (34) below the table (29), can be fed, by upward movement of said movable cutter (42), from below onto the transfer portion (12) which is static on the table (29).

5. A device according to claim 4 and, wherein a backing holder (45) located above the table (29) provided with a perforation (44), makes contact with the wrapping material web (10) during the transfer of the tape (11).

6. A device according to claim 5, wherein the cutter (42) and the backing holder (45) can be pivoted about axes lying on opposite sides of the table (29) and running transversely to the direction of transport of the wrapping material web (10).

7. A device according to claim 4, wherein the transfer portion (12) of the wrapping material web (10) is defined by fixed diverting rollers (13, 14).

8. A device according to claim 7, wherein the web loops (15, 16) are formed by said reciprocating diverting rollers (17, 18) located between fixed diverting rollers (21,22) and (14,23).

* * * * *